(12) United States Patent
Champ et al.

(10) Patent No.: US 7,838,567 B2
(45) Date of Patent: Nov. 23, 2010

(54) FOAMS MADE FROM WATER-ABSORBING, BASIC POLYMERS, METHOD FOR THE PRODUCTION AND UTILIZATION THEREOF

(75) Inventors: Samantha Champ, Ludwigshafen (DE); Hans-Joachim Hähnle, Neustadt (DE); Martin Beck, Maxdorf (DE); Rüdiger Funk, Niedernhausen (DE)

(73) Assignee: Basf Aktiengesellschaft, Ludwigshafen (DE)

( * ) Notice: Subject to any disclaimer, the term of this patent is extended or adjusted under 35 U.S.C. 154(b) by 1493 days.

(21) Appl. No.: 10/502,212

(22) PCT Filed: Jan. 30, 2003

(86) PCT No.: PCT/EP03/00927

§ 371 (c)(1),
(2), (4) Date: Jul. 20, 2004

(87) PCT Pub. No.: WO03/066716

PCT Pub. Date: Aug. 14, 2003

(65) Prior Publication Data

US 2005/0070616 A1    Mar. 31, 2005

(30) Foreign Application Priority Data

Feb. 6, 2002    (DE) ................. 102 04 980

(51) Int. Cl.
*C08J 9/12*    (2006.01)
(52) U.S. Cl. .................... 521/133; 521/62; 521/63; 521/134; 521/138; 521/139
(58) Field of Classification Search .......... 521/62, 521/63, 133, 134, 138, 139
See application file for complete search history.

(56) References Cited

U.S. PATENT DOCUMENTS

| | | | |
|---|---|---|---|
| 5,962,578 A | 10/1999 | Beihoffer et al. | |
| 5,981,689 A | 11/1999 | Mitchell et al. | |
| 6,025,404 A | 2/2000 | Harris et al. | |
| 6,087,448 A | 7/2000 | Mitchell et al. | |
| 6,121,409 A | 9/2000 | Mitchell et al. | |
| 6,136,873 A | 10/2000 | Hahnle et al. | |
| 6,194,631 B1 * | 2/2001 | Mitchell et al. | ............. 604/368 |
| 6,222,091 B1 | 4/2001 | Beihoffer et al. | |
| 6,235,965 B1 * | 5/2001 | Beihoffer et al. | ............ 604/368 |
| 6,245,410 B1 | 6/2001 | Hahnle et al. | |
| 6,455,600 B1 | 9/2002 | Hahnle et al. | |
| 6,750,262 B1 | 6/2004 | Hanhle et al. | |

FOREIGN PATENT DOCUMENTS

| | | |
|---|---|---|
| CA | 2370380 | 10/2000 |
| EP | 0 858 478 | 10/1996 |
| WO | WO 97/31600 | 9/1997 |
| WO | WO 99/44648 | 9/1999 |
| WO | WO 00/52087 | 9/2000 |
| WO | WO 00/63295 | 10/2000 |

\* cited by examiner

*Primary Examiner*—John Cooney
(74) *Attorney, Agent, or Firm*—Marshall, Gerstein & Borun LLP

(57) ABSTRACT

Foams composed of water-absorbing basic polymers, obtainable by (I) foaming a crosslinkable aqueous mixture including (a) at least one basic polymer whose basic groups have optionally been neutralized, (b) at least one crosslinker, (c) at least one surfactant, (d) optionally at least one solubilizer, (e) optionally thickeners, foam stabilizers, fillers, fibers and/or cell nucleators, and (f) optionally particulate water-absorbing acidic polymers, by dissolving a gas which is inert toward free radicals in the crosslinkable aqueous mixture under a pressure from 2 to 400 bar and subsequently decompressing the crosslinkable aqueous mixture to atmospheric or by dispersing fine bubbles of a gas which is inert toward free radicals, and (II) crosslinking the foamed mixture to form a hydrogel foam and if applicable adjusting the water content of the polymer foam to 1-60% by weight. Preparation of the foams by application of the abovementioned measures (I) and (II) and use of the thus obtainable foams in hygiene articles to absorb body fluids, in dressing material to cover wounds, as a sealing material, as a packaging material, as a soil improver, as a soil substitute, to dewater sludges, to absorb aqueous acidic wastes, to thicken waterborne paints or coatings in the course of disposing of residual quantities thereof, to dewater water-containing oils or hydrocarbons or as a material for filters in ventilation systems.

16 Claims, No Drawings

FOAMS MADE FROM WATER-ABSORBING, BASIC POLYMERS, METHOD FOR THE PRODUCTION AND UTILIZATION THEREOF

CROSS-REFERENCE TO RELATED APPLICATIONS

This is the U.S. national phase application of International Application No. PCT/EP03/00927, filed Jan. 30, 2003, which claims the benefit of German patent application No. 102 40 980.7, filed Feb. 6, 2002.

This invention relates to foams composed of water-absorbing basic polymers, processes for their preparation and their use in hygiene articles.

Water-absorbing, predominantly open-celled foams based on crosslinked acid-functional monomers are known, cf. EP-B-0 858 478, WO-A-99/44648 and WO-A-00/52087. They are prepared for example by foaming a polymerizable aqueous mixture containing at least 50 mol % neutralized acid-functional monoethylenically unsaturated monomers, crosslinkers and at least one surfactant and subsequently polymerizing the foamed mixture. The foaming of the polymerizable mixture can be effected for example by dispersing fine bubbles of a gas which is inert toward free radicals or by dissolving such a gas under elevated pressure in the polymerizable mixture and decompressing the mixture. The water content of the foams is adjusted to 1-60% by weight for example. The foams can optionally be subjected to surface postcrosslinking by spraying a crosslinker onto the foamed material or immersing the foam therein and heating the crosslinker-laden foam to a relatively high temperature. The foams are used for example in hygiene articles to acquire, distribute and store body fluids.

WO-A-97/31600 discloses an absorber element for use in hygiene or sanitary articles wherein a plurality of elements of a superabsorbent foam are arranged on a support in a grid pattern at such distances that the elements in the swollen state touch at their peripheries. For example, a monomer foam can be applied to the support in the desired grid pattern and then polymerized or separately prepared foam elements can be fixed on the support in the desired grid pattern by chemical or physical means. However, the permeability of the superabsorbent foams is still in need of improvement.

U.S. Pat. Nos. 5,981,689 and 6,121,409 disclose water-absorbing materials based on polyvinylamine gels. These materials consist essentially of a mixture of particulate polymers composed of a lightly crosslinked basic polymer, which has optionally been surface postcrosslinked, and an acidic polymer, each polymer being capable of absorbing water when in the polyelectrolyte form. Examples of such absorbing products are mixtures of particles of lightly crosslinked polyvinylamine in the form of the free base with particles of lightly crosslinked polyacrylic acid in the form of the free acid. As U.S. Pat. No. 5,981,689 also reveals, salts of crosslinked polyvinylamines can be used as water-absorbing polymers.

U.S. Pat. No. 5,962,578 likewise discloses water-absorbing materials composed of a mixture of particles of a crosslinked basic polymer and particles of an acidic water-absorbing polymer. Lightly crosslinked addition polymers of dialkylaminoalkyl-(meth)acrylamides are specified as a basic polymer. Similarly, lightly crosslinked particulate polymers of polyvinylguanidines can be used as basic polymers in mixture with acidic water-absorbing particulate polymers, cf. U.S. Pat. No. 6,087,448.

U.S. Pat. No. 6,222,091 discloses water-absorbing gel particles wherein each particle comprises microdomains of an acidic water-absorbing resin and of a basic water-absorbing resin. The above-described water-absorbing materials are used for example in hygiene articles to absorb body fluids.

WO-A-00/63295 likewise discloses hydrogel-forming particulate mixtures consisting of a lightly crosslinked basic polymer and a lightly crosslinked acidic polymer.

It is an object of the present invention to provide water-absorbing articles having a high absorption capacity, an improved permeability and an improved distribution.

We have found that this object is achieved by predominantly open-celled foams composed of water-absorbing basic polymers, obtainable by (I) foaming a crosslinkable aqueous mixture including
  (a) at least one basic polymer whose basic groups have optionally been neutralized,
  (b) at least one crosslinker,
  (c) at least one surfactant,
  (d) optionally at least one solubilizer,
  (e) optionally thickeners, foam stabilizers, fillers, fibers and/or cell nucleators, and
  (f) optionally particulate water-absorbing acidic polymers,
  by dissolving a gas which is inert toward free radicals in the crosslinkable aqueous mixture under a pressure from 2 to 400 bar and subsequently decompressing the crosslinkable aqueous mixture to atmospheric or by dispersing fine bubbles of a gas which is inert toward free radicals, and (II) crosslinking the foamed mixture to form a hydrogel foam and if applicable adjusting the water content of the polymer foam to 1-60% by weight.

The present invention further provides a process for producing foams composed of water-absorbing basic polymers, which comprises (I) foaming a crosslinkable aqueous mixture including
  (a) at least one basic polymer whose basic groups have optionally been neutralized,
  (b) at least one crosslinker,
  (c) at least one surfactant,
  (d) optionally at least one solubilizer,
  (e) optionally thickeners, foam stabilizers, fillers, fibers and/or cell nucleators, and
  (f) optionally particulate water-absorbing acidic polymers,
  by dissolving a gas which is inert toward free radicals in the crosslinkable aqueous mixture under a pressure from 2 to 400 bar and subsequently decompressing the crosslinkable aqueous mixture to atmospheric or by dispersing fine bubbles of a gas which is inert toward free radicals, and (II) crosslinking the foamed mixture to form a hydrogel foam and if applicable adjusting the water content of the polymer foam to 1-60% by weight.

(a) Basic Polymers

Useful basic polymers include for example polymers containing vinylamine units, polymers containing vinylguanidine units, polymers containing dialkylaminoalkyl(meth)acrylamide units, polyethyleneimines, ethyleneimine-grafted polyamidoamines and polydiallyldimethylammonium chlorides.

Polymers containing vinylamine units are known, cf. U.S. Pat. Nos. 4,421,602, 5,334,287, EP-A-0 216 387, U.S. Pat. No. 5,981,689, WO-A-00/63295 and U.S. Pat. No. 6,121,409. They are prepared by hydrolysis of polymers containing open-chain N-vinylcarboxamide units. These polymers are obtainable for example by polymerizing N-vinylformamide, N-vinyl-N-methylformamide, N-vinylacetamide, N-vinyl-N-methylacetamide, N-vinyl-N-ethylacetamide and N-vinylpropionamide. The monomers mentioned can be polymerized either alone or together with other monomers.

Useful monoethylenically unsaturated monomers for copolymerization with the N-vinylcarboxamides include all compounds copolymerizable therewith. Examples thereof are vinyl esters of saturated carboxylic acids of 1 to 6 carbon atoms such as vinyl formate, vinyl acetate, vinyl propionate and vinyl butyrate and vinyl ethers such as $C_1$-$C_6$-alkyl vinyl ethers, for example methyl vinyl ether or ethyl vinyl ether. Useful comonomers further include esters, amides and nitriles of ethylenically unsaturated $C_3$-$C_6$-carboxylic acids, such as for example methyl acrylate, methyl methacrylate, ethyl acrylate and ethyl methacrylate, acrylamide and methacrylamide and also acrylonitrile and methacrylonitrile.

Useful carboxylic esters are further derived from glycols or polyalkylene glycols, in either case only one OH group being esterified, for example hydroxyethyl acrylate, hydroxyethyl methacrylate, hydroxypropyl acrylate, hydroxybutyl acrylate, hydroxypropyl methacrylate, hydroxybutyl methacrylate and also acrylic monoesters of polyalkylene glycols having a molar mass from 500 to 10 000. Useful comonomers further include esters of ethylenically unsaturated carboxylic acids with amino alcohols such as for example dimethylaminoethyl acrylate, dimethylaminoethyl methacrylate, diethylaminoethyl acrylate, diethylaminoethyl methacrylate, dimethylaminopropyl acrylate, dimethylaminopropyl methacrylate, diethylaminopropyl acrylate, dimethylaminobutyl acrylate and diethylaminobutyl acrylate. The basic acrylates can be used in the form of the free bases, in the form of their salts with mineral acids such as hydrochloric acid, sulfuric acid or nitric acid, in the form of their salts with organic acids such as formic acid, acetic acid, propionic acid or sulfonic acids or in quaternized form. Useful quaternizing agents include for example dimethyl sulfate, diethyl sulfate, methyl chloride, ethyl chloride or benzyl chloride.

Useful comonomers further include amides of ethylenically unsaturated carboxylic acids such as acrylamide, methacrylamide and also N-alkylmonoamides and -diamides of monoethylenically unsaturated carboxylic acids having alkyl moieties of 1 to 6 carbon atoms, for example N-methylacrylamide, N,N-dimethylacrylamide, N-methylmethacrylamide, N-ethylacrylamide, N-propylacrylamide and tert-butylacrylamide and also basic (meth)acrylamides, for example dimethylaminoethylacrylamide, dimethylaminoethylmethacrylamide, diethylaminoethylacrylamide, diethylaminoethylmethacrylamide, dimethylaminopropylacrylamide, diethylaminopropylacrylamide, dimethylaminopropylmethacrylamide and diethylaminopropylmethacrylamide.

Useful comonomers further include N-vinylpyrrolidone, N-vinylcaprolactam, acrylonitrile, methacrylonitrile, N-vinylimidazole and also substituted N-vinylimidazoles such as for example N-vinyl-2-methylimidazole, N-vinyl-4-methylimidazole, N-vinyl-5-methylimidazole, N-vinyl-2-ethylimidazole and N-vinylimidazolines such as N-vinylimidazoline, N-vinyl-2-methylimidazoline and N-vinyl-2-ethylimidazoline. N-Vinylimidazoles and N-vinylimidazolines are used not only in the form of the free bases but also after neutralization with mineral acids or organic acids or in quaternized form, in which case the quaternization is preferably effected using dimethyl sulfate, diethyl sulfate, methyl chloride or benzyl chloride. It is further possible to use diallyldialkylammonium halides, for example diallyldimethylammonium chloride.

The copolymers contain for example
from 95 to 5 mol % and preferably from 90 to 10 mol % of at least one N-vinylcarboxamide, and
from 5 to 95 mol %, and preferably from 10 to 90 mol % of other monoethylenically unsaturated monomers copolymerizable therewith in copolymerized form. The comonomers are preferably free of acid groups.

To prepare polymers containing vinylamine units, it is preferable to start from homopolymers of N-vinylformamide or from copolymers obtainable by copolymerizing
N-vinylformamide with
vinyl formate, vinyl acetate, vinyl propionate, acrylonitrile, N-vinylcaprolactam, N-vinyl urea, N-vinylpyrrolidone or $C_1$-$C_6$-alkyl vinyl ethers and subsequently hydrolyzing the homo- or copolymers to form vinylamine units from the copolymerized N-vinylformamide units, the degree of hydrolysis being for example in the range from 5 to 100 mol % and preferably in the range from 70 to 100 mol %. The hydrolysis of the above-described polymers is effected according to known processes by the action of acids, bases or enzymes. When acids are used as a hydrolyzing agent, the vinylamine units of the polymers are present as an ammonium salt, whereas the hydrolysis with bases gives rise to free amino groups.

The degree of hydrolysis of the homopolymers of the N-vinylcarboxamides and their copolymers can be in the range from 5 to 100 mol % and is preferably in the range from 70 to 100 mol %. In most cases, the degree of hydrolysis of the homo- and copolymers is in the range from 80 to 95 mol %. The degree of hydrolysis of the homopolymers is equivalent to the level of vinylamine units in the polymers. In the case of copolymers which contain vinyl esters in copolymerized form, the hydrolysis of the N-vinylformamide units may be accompanied by a hydrolysis of the ester groups to form vinyl alcohol units. This is particularly the case when the hydrolysis of the copolymers is conducted in the presence of aqueous sodium hydroxide solution. Polymerized units of acrylonitrile will likewise undergo chemical changes in the course of the hydrolysis, producing for example amide groups or carboxyl groups. The homo- and copolymers containing vinylamine units may contain up to 20 mol % of amidine units, for example due to a reaction of formic acid with two adjacent amino groups or due to intramolecular reaction of an amino group with an adjacent amide group, for example of copolymerized N-vinylformamide. The molar masses of the polymers containing vinylamine units range for example from 500 to 10 million and preferably from 1000 to 5 million (determined by light scattering). This molar mass range corresponds for example to K values from 5 to 300 and preferably from 10 to 250 (determined after H. Fikentscher in 5% aqueous sodium chloride solution at 25° C. and at a polymer concentration of 0.5% by weight).

The polymers containing vinylamine units are preferably used in salt-free form. Salt-free aqueous solutions of polymers containing vinylamine units are preparable for example from the above-described salt-containing polymer solutions by ultrafiltration using suitable membranes having molecular weight cutoffs at for example from 1000 to 500 000 Dalton and preferably at from 10 000 to 300 000 Dalton. Similarly, the hereinbelow described aqueous solutions of other polymers containing amino and/or ammonium groups can be obtained in salt-free form by ultrafiltration.

Similarly, derivatives of polymers containing vinylamine units can be used as polymers forming basic hydrogels. For instance, polymers containing vinylamine units can be subjected to amidation, alkylation, sulfonamide formation, urea formation, thiourea formation, carbamate formation, acylation, carboxymethylation, phosphonomethylation or Michael addition of the amino groups of the polymer to prepare a multiplicity of suitable hydrogel derivatives. Of particular interest here are uncrosslinked polyvinylguanidines which are accessible by reaction of polymers containing vinylamine units, preferably polyvinylamines, with cyanamide ($R^1R^2N$—CN, where $R^1$, $R^2$=H, C1-C4-alkyl, C3-C6-cycloalkyl, phenyl, benzyl, alkyl-substituted phenyl or naphthyl) cf. U.S. Pat. No. 6,087,448 column 3 line 64 to column 5 line 14.

Polymers containing vinylamine units further include hydrolyzed graft polymers of for example N-vinylformamide on polyalkylene glycols, polyvinyl acetate, polyvinyl alcohol, polyvinylformamides, polysaccharides such as starch, oligosaccharides or monosaccharides. The graft polymers are obtainable for example by free-radically polymerizing N-vinylformamide in an aqueous medium in the presence of at least one of the grafting bases mentioned, optionally together with copolymerizable other monomers, and subsequently hydrolyzing the engrafted vinylformamide units in a known manner to obtain vinylamine units.

Useful water-absorbing basic polymers further include polymers of dialkylaminoalkyl(meth)acrylamides. Useful monomers for preparing such polymers include for example dimethylaminoethylacrylamide, dimethylaminoethylmethacrylamide, dimethylaminopropylacrylamide, dimethylaminopropylmethacrylamide, diethylaminoethylacrylamide, diethylaminoethylmethacrylamide and diethylaminopropylacrylamide. These monomers may be used in the form of the free bases, as salts with inorganic or organic acids or in quaternized form in the polymerization. They may be free-radically polymerized to homopolymers or together with other copolymerizable monomers to copolymers. The polymers contain for example at least 30 mol % and preferably at least 70 mol % of units derived from the basic monomers mentioned. Water-absorbing basic polymers based on poly(dimethylaminoalkylacrylamide)s are known from U.S. Pat. No. 5,962,578.

Useful basic polymers further include polyethyleneimines, which are preparable for example by polymerization of ethyleneimine in aqueous solution in the presence of acid-detaching compounds, acids or Lewis acids as a catalyst. Polyethyleneimines have for example molar masses of up to 2 million and preferably from 200 to 1 000 000. Particular preference is given to using polyethyleneimines having molar masses from 500 to 750 000. The polyethyleneimines may optionally be modified, for example alkoxylated, alkylated or amidated. They may also be subjected to a Michael addition or a Stecker synthesis. The polyethyleneimine derivatives obtainable thereby are likewise useful as basic polymers for preparing water-absorbing basic polymers.

Useful basic polymers further include ethyleneimine-grafted polyamidoamines, which are obtainable for example by condensing dicarboxylic acids with polyamines and subsequent grafting with ethyleneimine. Useful polyamidoamines are obtained for example by reacting dicarboxylic acids having 4 to 10 carbon atoms with polyalkylenepolyamines containing 3 to 10 basic nitrogen atoms in the molecule. Examples of dicarboxylic acids are succinic acid, maleic acid, adipic acid, glutaric acid, suberic acid, sebacic acid and terephthalic acid. Polyamidoamines may also be prepared using mixtures of dicarboxylic acids and/or mixtures of a plurality of polyalkylenepolyamines. Useful polyalkylenepolyamines include for example diethylenetriamine, triethylenetetramine, tetraethylenepentamine, dipropylenetriamine, tripropylenetetramine, dihexamethylenetriamine, aminopropylethylenediamine and bisaminopropylethylenediamine. To prepare polyamidoamines, the dicarboxylic acids and polyalkylenepolyamines are heated to comparatively high temperatures, for example to temperatures in the range from 120 to 220° C. and preferably in the range from 130 to 180° C. The water formed in the course of the condensation is removed from the system. The condensation may optionally also utilize lactones or lactams of carboxylic acids having 4 to 8 carbon atoms. The amount of polyalkylenepolyamine used per mole of a dicarboxylic acid is for example in the range from 0.8 to 1.4 mol. These polyamidoamines are grafted with ethyleneimine. The grafting reaction is carried out for example in the presence of acids or Lewis acids such as sulfuric acid or boron trifluoride etherates at for example from 80 to 100° C. Compounds of this kind are described in DE-B-24 34 816 for example.

Useful basic polymers further include the optionally crosslinked polyamidoamines, which may additionally have been grafted with ethyleneimine prior to any crosslinking. The crosslinked ethyleneimine-grafted polyamidoamines are water soluble and have for example an average molecular weight from 3000 to 2 million Dalton. Customary crosslinkers include for example epichlorohydrin or bischlorohydrin ethers of alkylene glycols and polyalkylene glycols.

Useful basic polymers further include polyallylamines. Polymers of this kind are obtained by homopolymerization of allylamine, preferably in acid-neutralized form, or by copolymerizing allylamine with other monoethylenically unsaturated monomers described above as comonomers for N-vinylcarboxamides.

Useful basic polymers further include water-soluble crosslinked polyethyleneimines which are obtainable by reaction of polyethyleneimines with crosslinkers such as epichlorohydrin or bischlorohydrin ethers of polyalkylene glycols having from 2 to 100 ethylene oxide and/or propylene oxide units and which still have free primary and/or secondary amino groups. Also suitable are amidic polyethyleneimines which are obtainable for example by amidation of polyethyleneimines with $C_1$-$C_{22}$-monocarboxylic acids. Useful cationic polymers further include alkylated polyethyleneimines and alkoxylated polyethyleneimines. The polyethyleneimine is alkoxylated using for example from 1 to 5 ethylene oxide or propyleneoxide units per NH unit in the polyethyleneimine.

The abovementioned basic polymers have for example K values from 8 to 300 and preferably from 15 to 180 (determined after H. Fikentscher in 5% aqueous sodium chloride solution at 25% and a polymer concentration of 0.5% by weight). At pH 4.5 their charge density is for example not less than 1 and preferably not less than 4 meq/g of polyelectrolyte.

Preferred basic polymers include polymers containing vinylamine units, polyvinylguanidines and polyethyleneimines. Examples thereof are:

vinylamine homopolymers, 10-100% hydrolyzed polyvinylformamides, partially or completely hydrolyzed copolymers of vinylformamide and vinyl acetate, vinyl alcohol, vinylpyrrolidone or acrylamide each having molar masses of 3000-2 000 000 and also polyethyleneimines, crosslinked polyethyleneimines or amidated polyethyleneimines which each have molar masses from 500 to 3 000 000. The polymer content of the aqueous solution is for example, from 1 to 60%, preferably from 2 to 15% and usually from 5 to 10% by weight.

(b) Crosslinkers

To convert the above-described basic polymers into water-absorbing basic polymers, they are reacted with at least one crosslinker. The basic polymers are usually soluble or readily dispersible in water. Crosslinking is therefore mainly carried out in an aqueous medium. Preference is given to using aqueous solutions of basic polymers that have been desalted, for example by ultrafiltration, or whose neutral salt content is below 1% or below 0.5% by weight. The crosslinkers have at least two reactive groups capable of reacting with the amino groups of the basic polymers to form insoluble products which are water-absorbing polymers. The amount of crosslinker used per 1 part by weight of basic polymer is for example in the range from 0.1 to 50 parts by weight, preferably in the range from 1 to 5 parts by weight and especially in the range from 1.5 to 3 parts by weight. Useful crosslinkers are described in Wo-A-00/63295 page 14 line 43 to page 21 line 5.

Useful bi- or polyfunctional crosslinkers include for example
(1) di- and polyglycidyl compounds
(2) di- and polyhalogen compounds
(3) compounds having two or more isocyanate groups, which may be blocked
(4) polyaziridines
(5) carbonic acid derivatives
(6) compounds having two or more activated double bonds capable of undergoing a Michael addition
(7) di- and polycarboxylic acids and acid derivatives thereof
(8) monoethylenically unsaturated carboxylic acids, esters, amides and anhydrides
(9) di- and polyaldehydes and di- and polyketones.

Preferred crosslinkers (1) are for example the bischlorohydrin ethers of polyalkylene glycols described in U.S. Pat. No. 4,144,123. Phosphoric acid diglycidyl ether and ethylene glycol diglycidyl ether are also suitable.

Further crosslinkers are the products of reacting at least trihydric alcohols with epichlorohydrin to form reaction products having at least two chlorohydrin units, polyhydric alcohols used being for example glycerol, ethoxylated or propoxylated glycerols, polyglycerols having 2 to 15 glycerol units in the molecule and also optionally ethoxylated and/or propoxylated polyglycerols. Crosslinkers of this type are known from DE-A-2 916 356 for example.

Useful crosslinkers (2) are α,ω- or vicinal dichloroalkanes, for example 1,2-dichloroethane, 1,2-dichloropropane, 1,3-dichlorobutane and 1,6-dichlorohexane.

Furthermore, EP-A-0 025 515 discloses α,ω-dichloropolyalkylene glycols having preferably 1-100, especially 1-100 ethylene oxide, units for use as crosslinkers.

Useful crosslinkers further include crosslinkers (3) which contain blocked isocyanate groups, for example trimethylhexamethylene diisocyanate blocked with 2,2,6,6-tetramethylpiperidin-4-one. Such crosslinkers are known; cf. for example from DE-A-4 028 285.

Preference is further given to crosslinkers (4) which contain aziridine units and are based on polyethers or substituted hydrocarbons, for example 1,6-bis-N-aziridinomethane, cf. U.S. Pat. No. 3,977,923. This class of crosslinkers further includes products formed by reacting dicarboxylic esters with ethyleneimine and containing at least two aziridino groups, and mixtures thereof.

Useful halogen-free crosslinkers of group (4) include reaction products prepared by reacting ethyleneimine with dicarboxylic esters completely esterified with monohydric alcohols of from 1 to 5 carbon atoms. Examples of suitable dicarboxylic esters are dimethyl oxalate, diethyl oxalate, dimethyl succinate, diethyl succinate, dimethyl adipate, diethyl adipate and dimethyl glutarate. For instance, reacting diethyl oxalate with ethyleneimine gives bis[β-(1-aziridino) ethyl]oxalamide. Dicarboxylic esters are reacted with ethyleneimine in a molar ratio of 1: at least 4. The reactive groups of these crosslinkers are the terminal aziridine groups. These crosslinkers may be characterized for example with the aid of the formula:

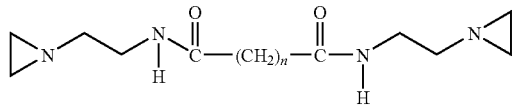

where n is from 0 to 22.

Illustrative of crosslinkers (5) are ethylene carbonate, propylene carbonate, urea, thiourea, guanidine, dicyandiamide or 2-oxazolidinone and its derivatives. Of this group of monomers, preference is given to using propylene carbonate, urea and guanidine.

Crosslinkers (6) are reaction products of polyetherdiamines, alkylenediamines, polyalkylenepolyamines, alkylene glycols, polyalkylene glycols or mixtures thereof with monoethylenically unsaturated carboxylic acids, esters, amides or anhydrides of monoethylenically unsaturated carboxylic acids, which reaction products contain at least two ethylenically unsaturated double bonds, carboxamide, carboxyl or ester groups as functional groups, and also methylenebisacrylamide and divinyl sulfone.

Crosslinkers (6) are for example reaction products of polyetherdiamines having preferably from 2 to 50 alkylene oxide units, alkylenediamines such as ethylenediamine, propylenediamine, 1,4-diaminobutane and 1,6-diaminohexane, polyalkylenepolyamines having molecular weights <5000 for example diethylenetriamine, triethylenetetramine, dipropylenetriamine, tripropylenetetramine, dihexamethylenetriamine and aminopropylethylenediamine, alkylene glycols, polyalkylene glycols or mixtures thereof with monoethylenically unsaturated carboxylic acids,
esters of monoethylenically unsaturated carboxylic acids,
amides of monoethylenically unsaturated carboxylic acids, and
anhydrides of monoethylenically unsaturated carboxylic acids.

These reaction products and their preparation are described in EP-A-873 371 and are expressly mentioned for use as crosslinkers.

Particularly preferred crosslinkers are the therein mentioned reaction products of maleic anhydride with α,ω-polyetherdiamines having a molar mass of from 400 to 5000, the reaction products of polyethyleneimines having a molar mass of from 129 to 50 000 with maleic anhydride and also the reaction products of ethylenediamine or triethylenetetramine with maleic anhydride in a molar ratio of 1: at least 2.

Crosslinkers (6) are preferably compounds of the formula

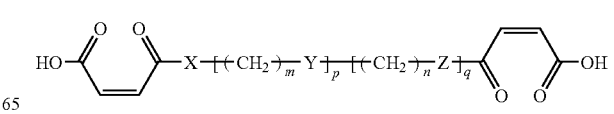

where X, Y, Z=O, NH
and Y is additionally $CH_2$
m, n=0-4
p, q=0-45 000, which are obtainable by reacting polyetherdiamines, ethylenediamine or polyalkylenepolyamines with maleic anhydride.

Further halogen-free crosslinkers of group (7) are at least dibasic saturated carboxylic acids such as dicarboxylic acids and also the salts, diesters and diamides derived therefrom. These compounds may be characterized for example by means of the formula

X—CO—$(CH_2)_n$—CO—X where X=OH, $OR^1$, $N(R^2)_2$
$R^1$=$C_1$-$C_{22}$-alkyl,
$R^2$=H, $C_1$-$C_{22}$-alkyl and
n=0–22.

As well as dicarboxylic acids of the abovementioned formula it is possible to use, for example, monoethylenically unsaturated dicarboxylic acids such as maleic acid or itaconic acid. The esters of the contemplated dicarboxylic acids are preferably derived from alcohols having from 1 to 4 carbon atoms. Examples of suitable dicarboxylic esters are dimethyl oxalate, diethyl oxalate, diisopropyl oxalate, dimethyl succinate, diethyl succinate, diisopropyl succinate, di-n-propyl succinate, diisobutyl succinate, dimethyl adipate, diethyl adipate and diisopropyl adipate or Michael addition products which contain at least two ester groups and are formed from polyetherdiamines, polyalkylenepolyamines or ethylenediamine and esters of acrylic acid or methacrylic acid with, in each case, monohydric alcohols of from 1 to 4 carbon atoms. Examples of suitable esters of ethylenically unsaturated dicarboxylic acids are dimethyl maleate, diethyl maleate, diisopropyl maleate, dimethyl itaconate and diisopropyl itaconate. It is also possible to use substituted dicarboxylic acids and their esters such as tartaric acid (D,L-form and as racemate) and also tartaric esters such as dimethyl tartrate and diethyl tartrate.

Examples of suitable dicarboxylic anhydrides are maleic anhydride, itaconic anhydride and succinic anhydride. Useful crosslinkers (7) further include for example dimethyl maleate, diethyl maleate and maleic acid. The crosslinking of amino-containing compounds with the aforementioned crosslinkers takes place with the formation of amide groups or, in the case of amides such as adipamide, by transamidation. Maleic esters, monoethylenically unsaturated dicarboxylic acids and their anhydrides can bring about crosslinking both by formation of carboxamide groups and by addition of NH groups of the component to be crosslinked (polyamidoamines, for example) in the manner of a Michael addition.

The at least dibasic saturated carboxylic acids of crosslinker class (7) include for example tri- and tetracarboxylic acids such as citric acid, propanetricarboxylic acid, nitrilotriacetic acid, ethylenediaminetetraacetic acid, butanetetracarboxylic acid and diethylenetriaminepentaacetic acid. Useful crosslinkers of group (7) further include the salts, esters, amides and anhydrides derived from the aforementioned carboxylic acids, e.g., dimethyl tartrate, diethyl tartrate, dimethyl adipate and diethyl adipate.

Useful crosslinkers of group (7) further include polycarboxylic acids obtainable by polymerizing monoethylenically unsaturated carboxylic acids, anhydrides, esters or amides. Examples of suitable monoethylenically unsaturated carboxylic acids are acrylic acid, methacrylic acid, fumaric acid, maleic acid and/or itaconic acid. Examples of useful crosslinkers are accordingly polyacrylic acids, copolymers of acrylic acid and methacrylic acid or copolymers of acrylic acid and maleic acid. Illustrative comonomers are vinyl ether, vinyl formate, vinyl acetate and vinyllactam.

Further useful crosslinkers (7) are prepared for example by free-radical polymerization of anhydrides such as maleic anhydride in an inert solvent such as toluene, xylene, ethylbenzene, isopropylbenzene or solvent mixtures. Besides the homopolymers, copolymers of maleic anhydride are suitable, for example copolymers of acrylic acid and maleic anhydride or copolymers of maleic anhydride and a $C_2$- to $C_{30}$-olefin.

Examples of preferred crosslinkers (7) are copolymers of maleic anhydride and isobutene or copolymers of maleic anhydride and diisobutene. Copolymers containing anhydride groups may optionally be modified by reaction with $C_1$- to $C_{20}$-alcohols or ammonia or amines and be used as crosslinkers in that form.

Examples of preferred polymeric crosslinkers (7) are copolymers of acrylamide and acrylic esters, for example hydroxyethyl acrylate or methyl acrylate, the molar ratio of acrylamide and acrylic ester varying in the range from 90:10 to 10:90. Besides these copolymers, terpolymers can be used, an example of the useful combinations being acrylamide, methacrylamide and acrylate/methacrylate.

The molar mass $M_W$ of the homo- and copolymers may be up to 10 000, preferably from 500 to 5000. Polymers of the abovementioned type are described for example in EP-A-0 276 464, U.S. Pat. No. 3,810,834, GB-A-1 411 063 and U.S. Pat. No. 4,818,795. The at least dibasic saturated carboxylic acids and the polycarboxylic acids may also be used as crosslinkers in the form of the alkali metal or ammonium salts. Preference is given to using the sodium salts. The polycarboxylic acids may be partially neutralized, for example to an extent of from 10 to 50 mol %, or else completely neutralized.

Useful halogen-free crosslinkers of group (8) include for example monoethylenically unsaturated monocarboxylic acids such as acrylic acid, methacrylic acid and crotonic acid and the amides, esters and anhydrides derived therefrom. The esters may be derived from alcohols of 1 to 22, preferably of from 1 to 18, carbon atoms. The amides are preferably unsubstituted, but may bear a $C_1$-$C_{22}$-alkyl substituent.

Preferred crosslinkers (8) are acrylic acid, methyl acrylate, ethyl acrylate, acrylamide and methacrylamide.

Useful halogen-free crosslinkers of group (9) include for example dialdehydes or their hemiacetals or acetals as precursors, for example glyoxal, methylglyoxal, malonaldehyde, succinaldehyde, maleialdehyde, fumaraldehyde, tartaraldehyde, adipaldehyde, 2-hydroxyadipaldehyde, furan-2,5-dipropionaldehyde, 2-formyl-2,3-dihydropyran, glutaraldehyde, pimelaldehyde and also aromatic dialdehydes such as, for example, terephthalaldehyde, o-phthalaldehyde, pyridine-2,6-dialdehyde or phenylglyoxal. But it is also possible to use homo- or copolymers of acrolein or methacrolein having molar masses of from 114 to about 10 000. Useful comonomers include in principle all water-soluble comonomers, for example acrylamide, vinyl acetate and acrylic acid. Aldehyde starches are similarly useful as crosslinkers.

Useful halogen-free crosslinkers of group (9) include for example diketones or the corresponding hemiketals or ketals as precursors, for example β-diketones such as acetylacetone or cycloalkane-1,n-diones such as, for example, cyclopentane-1,3-dione and cyclohexane-1,4-dione. But it is also possible to use homo- or copolymers of methyl vinyl ketone having molar masses of from 140 to about 15 000. Useful comonomers include in principle all water-soluble monomers, for example acrylamide, vinyl acetate and acrylic acid.

It will be appreciated that mixtures of two or more crosslinkers may also be used.

Preferred crosslinkers are glycidyl ethers of alkylene glycols such as ethylene glycol, propylene glycol, 1,4-butanediol, 1,6-hexanediol and polyalkylene glycols having molar masses up to 1500 and also the completely acrylated and/or methacrylated addition products of from 1 to 25 mol and preferably from 2 to 15 mol of ethylene oxide and 1 mol of trimethylolpropane or pentaerythritol.

(c) Surfactants

The crosslinkable aqueous mixtures include from 0.1 to 20% by weight of at least one surfactant as a further component. The surfactants are of decisive importance for forming and stabilizing the foam. It is possible to use anionic, cationic or nonionic surfactants or surfactant mixtures which are compatible with each other. It is possible to use low molecular weight or else polymeric surfactants, and combinations of different or else similar types of surfactants have been determined to be advantageous. Examples of nonionic surfactants are addition products of alkylene oxides, especially ethylene oxide, propylene oxide and/or butylene oxide, with alcohols, amines, phenols, naphthols or carboxylic acids. The surfactants used are advantageously addition products of ethylene oxide and/or propylene oxide with alcohols containing at least 10 carbon atoms, the addition products containing from 3 to 200 mol of ethylene oxide and/or propylene oxide per mole of alcohol. The alkylene oxide units are present in the addition products in the form of blocks or in random distribution. Examples of nonionic surfactants are the addition products of 7 mol of ethylene oxide with 1 mol of tallow fat alcohol, reaction products of 9 mol of ethylene oxide with 1 mol of tallow fat alcohol and addition products of 80 mol of ethylene oxide with 1 mol of tallow fat alcohol. Further commercially available nonionic surfactants comprise reaction products of oxo process alcohols or Ziegler alcohols with from 5 to 12 mol of ethylene oxide per mole of alcohol, especially with 7 mol of ethylene oxide. Further commercially available nonionic surfactants are obtained by ethoxylation of castor oil. The amount of ethylene oxide added per mole of castor oil is for example in the range from 12 to 80 mol. Further commercially available products are for example the reaction products of 18 mol of ethylene oxide with 1 mol of tallow fat alcohol, the addition products of 10 mol of ethylene oxide with 1 mol of a $C_{13}/Cl_5$ oxo process alcohol or the reaction products of from 7 to 8 mol of ethylene oxide with 1 mol of a $C_{13}/Cl_5$ oxo process alcohol. Useful nonionic surfactants further include phenol alkoxylates such as for example p-tert-butylphenol which has been reacted with 9 mol of ethylene oxide or methyl ethers of reaction products of 1 mol of a $C_{12}$-$C_{18}$ alcohol and 7.5 mol of ethylene oxide.

The nonionic surfactants described above, for example by esterification with sulfuric acid, can be converted into the corresponding acid sulfuric esters. The acid sulfuric esters are used in the form of their alkali metal or ammonium salts as anionic surfactants. Useful anionic surfactants include for example alkali metal or ammonium salts of acid sulfuric esters of addition products of ethylene oxide and/or propylene oxide with fatty alcohols, alkali metal or ammonium salts of alkylbenzenesulfonic acid or of alkylphenol ether sulfates. Products of the kind mentioned are commercially available. For example, the sodium salt of an acid sulfuric ester of a $C_{13}/C_{15}$ oxo process alcohol reacted with 106 mol of ethylene oxide, the triethanolamine salt of dodecylbenzenesulfonic acid, the sodium salt of alkylphenol ether sulfates and the sodium salt of the acid sulfuric ester or the reaction product of 106 mol of ethylene oxide with 1 mol of tallow fat alcohol are commercially available anionic surfactants. Useful anionic surfactants further include acid sulfuric esters of $C_{13}/C_{15}$ oxo process alcohols, paraffinsulfonic acids such as $C_{15}$-alkylsulfonate, alkyl-substituted benzenesulfonic acids and alkyl-substituted naphthalenesulfonic acids such as dodecylbenzenesulfonic acid and di-n-butylnaphthalenesulfonic acid and also fatty alcohol phosphates such as $C_{15}/C_{18}$ fatty alcohol phosphate. The polymerizable aqueous mixture can include combinations of a nonionic surfactant and an anionic surfactant or combinations of nonionic surfactants or combinations of anionic surfactants. Even cationic surfactants are suitable. Examples thereof are the dimethyl sulfate quaternized reaction products of 6.5 mol of ethylene oxide with 1 mol of oleylamine, distearyldimethylammonium chloride, lauryltrimethylammonium chloride, cetylpyridinium bromide and dimethyl sulfate quaternized triethanolamine stearate, which is preferably used as a cationic surfactant.

The surfactant content of the aqueous mixture is preferably in the range from 0.5 to 10% by weight. In most cases, the aqueous mixtures have a surfactant content from 1.5 to 8% by weight.

(d) Solubilizers

The crosslinkable aqueous mixtures may optionally include at least one solubilizer as a further component. Solubilizers are water-miscible organic solvents, for example dimethyl sulfoxide, dimethylformamide, N-methylpyrrolidone, monohydric alcohols, glycols, polyethylene glycols or monoethers derived therefrom, subject to the proviso that the monoethers do not contain any double bonds in the molecule. Useful ethers include methylglycol, butylglycol, butyldiglycol, methyldiglycol, butyltriglycol, 3-ethoxy-1-propanol and glycerol monomethyl ether.

The aqueous mixtures include from 0 to 50% by weight of at least one solubilizer. When solubilizers are used, they are preferably included in the aqueous mixture in an amount from 1 to 25% by weight.

(e) Thickeners, Foam Stabilizers, Fillers, Fibers, Cell Nucleators

The crosslinkable aqueous mixture may optionally include thickeners, foam stabilizers, fillers, fibers and/or cell nucleators. Thickeners are used for example to optimize foam structure and to improve foam stability. As a result, the foam will shrink only minimally during the polymerization. Useful thickeners include all natural and synthetic polymers known for this purpose that substantially increase the viscosity of an aqueous system and do not react with the amino groups of the basic polymers. The synthetic and natural polymers in question can be swellable or soluble in water. An exhaustive overview of thickeners may be found for example in the publications by R. Y. Lochhead and W. R. Fron, Cosmetics & Toiletries, 108, 95-135 (May 1993) and M. T. Clarke, "Rheological Additives" in D. Laba (ed.) "Rheological Properties of Cosmetics and Toiletries", Cosmetic Science and Technology Series, Vol. 13, Marcel Dekker Inc., New York 1993.

Water-swellable or water-soluble synthetic polymers useful as thickeners include for example high molecular weight polyethylene glycols or copolymers of ethylene glycol and propylene glycol and also high molecular weight polysaccharides such as starch, guar flour, locust bean flour or derivatives of natural substances such as carboxymethylcellulose, hydroxyethylcellulose, hydroxymethylcellulose, hydroxypropylcellulose and mixed cellulose ethers. A further group of thickeners are water-insoluble products, such as finely divided silica, zeolites, bentonite, cellulose powders and other finely divided powders of crosslinked polymers. The aqueous mixtures may include the thickeners in amounts up to 30% by weight. When such thickeners are used at all, they are included in the aqueous mixture in amounts of 0.1%, preferably 0.5% up to 20% by weight.

To optimize foam structure, the aqueous reaction mixture may be admixed, if applicable, with hydrocarbons having at least 5 carbon atoms in the molecule. Useful hydrocarbons include for example pentane, cyclopentane, hexane, cyclohexane, heptane, octane, isooctane, decane and dodecane. The contemplated aliphatic hydrocarbons can be straight-chain, branched or cyclic and have a boiling temperature which is above the temperature of the aqueous mixture during foaming. The aliphatic hydrocarbons extend the pot life of the foamed aqueous reaction mixture which has not yet polymerized. This facilitates the handling of the foams which have not yet polymerized and increases process consistency. The hydrocarbons act for example as cell nucleators and also stabilize the foam which has already formed. In addition, they can effect a further foaming of the mixture in the course of the polymerization of the monomer foam. They can then also have the function of a blowing agent. Instead of hydrocarbons or a mixture therewith, it is also possible to use optionally chorinated or fluorinated hydrocarbons as a cell nucleator and/or foam stabilizer, for example dichloromethane, trichloromethane, 1,2-dichloroethane, trichlorofluoromethane or 1,1,2-trichlorotrifluoroethane. When hydrocarbons are used, they are used for example in amounts from 0.1 to 20% by weight and preferably from 0.1 to 10% by weight, based on the polymerizable aqueous mixture.

To modify the properties of the foams, the crosslinkable aqueous mixture may have added to it one or more fillers, for example chalk, talc, clay, titanium dioxide, magnesium oxide, aluminum oxide, precipitated silicas in hydrophilic or hydrophobic forms, dolomite and/or calcium sulfate. The particle size of the fillers is for example in the range from 10 to 1000 μm and preferably in the range from 50 to 850 μm. Fillers can be included in the crosslinkable aqueous mixture in amounts up to 30% by weight.

The properties of the foams can optionally also be modified by means of fibers. The fibers in question can be natural or synthetic fibers or fiber blends, for example fibers composed of cellulose, wool, polyethylene, polypropylene, polyesters or polyamides. When fibers are used, they may be present in the aqueous mixture in an amount of for example up to 200% by weight and preferably up to 25% by weight. Fillers and fibers can optionally also be added to the ready-foamed mixture. The use of fibers leads to an enhancement of the strength properties, such as wet strength, of the ready-produced foam.

(f) Water-Absorbing Acidic Polymers

Useful water-absorbing acidic polymers, hereinafter also referred to as acidic superabsorbents, include all hydrogels described for example in WO-A-00/63295 page 2 line 27 to page 9 line 16. The materials in question are essentially lightly crosslinked polymers of acidic monomers that possess a high water uptake ability when in at least partially neutralized form. Examples of such crosslinked polymers, which are each lightly crosslinked, are crosslinked polyacrylic acids, crosslinked hydrolyzed graft polymers of acrylonitrile on starch, hydrolyzed crosslinked graft polymers of acrylic acid on starch, hydrolyzed crosslinked copolymers of vinyl acetate and acrylic esters, crosslinked polyacrylamides, hydrolyzed crosslinked polyacrylamides, crosslinked copolymers of ethylene and maleic anhydride, crosslinked copolymers of isobutylene and maleic anhydride, crosslinked polyvinylsulfonic acids, crosslinked polyvinylphosphonic acids and crosslinked sulfonated polystyrene. The acidic superabsorbents mentioned can be added to the crosslinkable aqueous mixture either alone or in mixture with each other. The acidic superabsorbents used are preferably particulate polymers of neutralized polyacrylic acids which are lightly crosslinked. The acid groups of the acidic superabsorbents are preferably neutralized with aqueous sodium hydroxide solution, with sodium bicarbonate or with sodium carbonate. The neutralization can also be effected, however, with aqueous potassium hydroxide solution, ammonia, amines or alkanolamines such as ethanolamine, diethanolamine or triethanolamine.

The water-absorbing acidic polymers are added in particulate form to the crosslinkable mixture or preferably to the already foamed crosslinkable mixture. The particles can be used in solid form or in foamed form. The weight average particle diameter is for example in the range from 10 to 2000 μm, preferably in the range from 100 to 850 μm and usually in the range from 150 to 450 μm. Superabsorbents having the appropriate particle sizes can be prepared for example by comminution, for example by grinding, of coarsely granular, solid superabsorbents or of foamed superabsorbents. The density of the foamed acidic superabsorbents is for example in the range from 0.01 to 0.9 g/cm$^3$ and preferably in the range from 0.05 to 0.7 g/cm$^3$. The surface of the particulate superabsorbents can have been postcrosslinked, if desired. It is preferable to use acidic superabsorbents whose surface has not been postcrosslinked.

Acidic superabsorbents are known from the above-cited references, cf. in particular WO-A-00/63295 page 6 line 36 to page 7 line 44. Surface postcrosslinking is effected, for example, by reacting particles of lightly crosslinked polyacrylic acids with compounds having at least two carboxyl-reactive groups. The compounds in question are typical crosslinkers which were indicated above under (b). Compounds which are of particular interest for use as crosslinkers include for example, polyhydric alcohols such as propylene glycol, 1,4-butanediol or 1,6-hexanediol and glycidyl ethers of ethylene glycol and polyethylene glycols having molar masses from 200 to 1500 and preferably from 300 to 400 and completely acrylated or methacrylated reaction products of trimethylolpropane, of reaction products formed from trimethylolpropane and ethyleneoxide in a molar ratio from 1:1 to 1:25 and preferably from 1:3 to 1:15 and also of reaction products of pentaerythritol with ethylene oxide in a molar ratio of 1:30 and preferably a molar ratio from 1:4 to 1:20. The postcrosslinking of the surface of the anionic superabsorbent particles is carried out for example at up to 220° C., for example preferably in the range from 120 to 190° C.

The water-absorbing acidic polymers used are superabsorbents in the form of particles having the above-indicated particle sizes. When water-absorbing acidic polymers are incorporated into the crosslinkable aqueous mixture, the polymer mixture will include for example from 10 to 90% and preferably from 30 to 70% by weight of a water-absorbing acidic polymer. The mixture of foamed basic hydrogel and the optionally foamed acidic hydrogel will usually include from 40 to 60% by weight of the acidic superabsorbent.

To prepare foams which have a high absorptive ability even for saline aqueous solutions, the basic and acidic superabsorbents are preferably used in unneutralized form. The degree of neutralization of the acidic water-absorbing polymers is for example from 0 to 100, preferably from 0 to 75 and usually from 0 to 50 mol %. The water-absorbing basic polymers have a higher uptake capacity for saline aqueous solutions and especially acidic aqueous solutions when in the form of the free bases than in acid-neutralized form. When basic polymers are used as sole water-absorbing polymers, the degree of neutralization is for example from 0 to 100 and preferably from 0 to 60 mol %.

Preparing the Foam

The above-described crosslinkable aqueous mixture, which includes (a) a basic polymer, (b) a crosslinker and (c) a surfactant as mandatory components and also at least one of the optional components (d), (e) and/or (f), is initially foamed. For example, an inert gas can be dissolved in the crosslinkable aqueous mixture at a pressure of for example 2-400 bar and the mixture subsequently decompressed to atmospheric. Decompression from a nozzle produces a flowable foam. The crosslinkable aqueous mixture can also be foamed by another method, namely by dispersing fine bubbles of an inert gas in the crosslinkable aqueous mixture. The foaming of the crosslinkable aqueous mixture on a laboratory scale can be effected for example by foaming the aqueous mixture in a kitchen processor equipped with a whisk. Foaming is preferably carried out in an inert gas atmosphere, for example in nitrogen or noble gases under atmospheric or superatmospheric pressure, for example up to 25 bar, and subsequent decompression. The consistency of the foams, the size of the gas bubbles and the distribution of the gas bubbles in the foam can be varied in wide limits, for example through the choice of surfactants, solubilizers, foam stabilizers, cell nucleators, thickeners and fillers. As a result, the density, the open-cell content of the foam and the wall thickness of the foam are readily adjustable to specific values. The aqueous mixture is preferably foamed at temperatures which are below the boiling point of the constituents of the aqueous mixture, for example in the range from room temperature to 100° C. and preferably in the range from 20 to 50° C. However, the aqueous mixture can also be foamed at temperatures above the boiling point of the component having the lowest boiling point by foaming the mixture in a pressure tightly sealed container. The foams obtained are crosslinkable mixtures which are flowable and stable for a prolonged period. The density of the foamed crosslinkable mixture is for example in the range from 0.01 to 0.9 g/cm$^3$ at 20° C.

Crosslinking the Foamed Mixture

The second step of the process comprises crosslinking the basic polymer to form a water-absorbing basic polymer. The originally water-soluble polymer is rendered water-insoluble by crosslinking. A hydrogel of a basic polymer is obtained. The crosslinkable foams are for example transferred into suitable molds and heated therein, so that the crosslinkers react with the basic polymer. The foamed material can be applied for example in the desired thickness to a temporary carrier material which advantageously has been provided with an antistick coating. The foam can be knife coated onto a support for example. Another possibility is to fill the aqueous foam mix into molds which have likewise been antistick coated.

Since the foamed aqueous mixture has a long pot life, this mixture is also suitable for producing composite materials. For example, it can be applied to a permanent carrier material, for example polymeric films (films of polyethylene, polypropylene or polyamide for example) or metal such as aluminum foils. The foamed aqueous mixture can also be applied to nonwovens, fluff, tissues, wovens, natural or synthetic fibers or other foams. To prepare composite materials, it may be preferable to apply the foam in the shape of defined structures or in different layer thickness to a carrier material. However, it is also possible to apply the foam to fluff layers or nonwovens and to impregnate these materials in such a way that the fluff becomes an integral part of the foam after crosslinking. The foamed aqueous mixture obtainable in the first process step can also be molded into large blocks before crosslinking. After crosslinking, the blocks can be cut or sawed into smaller articles. It is also possible to prepare sandwich like structures by applying a foamed aqueous mixture to a support, covering the foam layer with a film, foil, nonwoven, tissue, woven, fibers or other foam and crosslinking the sandwich like structure by heating. However, it is also possible, before or after crosslinking, to apply at least one further layer composed of a foamed crosslinkable layer and if desired cover it with a further film, foil, nonwoven, tissue, woven, fibers or other materials. The composite is then subjected to crosslinking in the second process step. However, it is also possible to prepare sandwich like structures having further foam layers of the same density or different densities.

Inventive foam layers having a layer thickness of up to about 1 millimeter are prepared for example by heating one side or in particular by irradiating one side of the foamed crosslinkable aqueous mixture. When thicker layers of a foam are to be produced, for example foams having thicknesses of two or more centimeters, it is particularly advantageous to heat the crosslinkable foamed material by means of microwaves, since relatively uniform heating can be obtained in this way. In this case, the crosslinking is effected for example at from 20 to 180° C., preferably in the range from 20 to 100° C. and especially in the range from 65 to 80° C. When thicker foam layers are to be crosslinked, the foamed mixture is heat treated on both surfaces, for example using contact heating or by irradiation. The density of the basic hydrogel foams is essentially equal to the density of the crosslinkable aqueous mixture. Foams of water-absorbing basic polymers are accordingly obtained in a density of for example from 0.01 to 0.9 g/cm$^3$ and preferably from 0.1 to 0.7 g/cm$^3$. The basic polymer foams are open celled. The open-cell content is for example at least 80% and preferably above 90%. Particular preference is given to foams having an open-cell content of 100%. The open-cell content of the foam is determined using scanning electron microscopy for example.

Foams having a particularly high water uptake capacity and an improved uptake ability for electrolyte-containing aqueous solutions are obtainable by crosslinking foamed aqueous mixtures which, based on the polymer mixture, include from 10 to 90% by weight of a finely divided water-absorbing acidic polymer. The acidic hydrogel can be present in the foams of the invention as a solid particulate polymer or as a foamed particulate polymer having particle sizes of for example 10-2000 μm.

After the crosslinking of the foamed mixture or during the crosslinking, the hydrogel foam is dried. This removes water and other volatile constituents from the crosslinked hydrogel foam. Preferably, the hydrogel foam is dried after it has been crosslinked. Examples of suitable drying processes are thermal convection drying, for example tray, chamber, duct, flat sheet, disk, rotary drum, free fall tower, foraminous belt, flow, fluidized bed, moving bed, paddle and ball bed drying, thermal contact drying such as hotplate, drum, belt, foraminous cylinder, screw, tumble and contact disk drying, radiative drying such as infrared drying, dielectric drying such as microwave drying and freeze drying. To avoid unwelcome decomposition and crosslinking reactions, it may be advantageous to dry under reduced pressure, under a protective gas atmosphere and/or under benign thermal conditions where the product temperature does not exceed 120° C., preferably 100° C. Particularly suitable drying processes are (vacuum) belt drying and paddle drying.

After drying, the hydrogel foam will usually no longer contain any water. However, the water content of the foamed material can be adjusted to any desired value by moistening the foam with liquid water or water vapor. The water content of the gel foam is usually in the range from 1 to 60% by weight and preferably in the range from 2 to 10% by weight. The water content can be used to adjust the flexibility of the hydrogel foam. Completely dried hydrogel foams are rigid and brittle, whereas foamed materials having a water content of for example 5-20% by weight are flexible. The foamed hydrogels can either be used directly in the form of sheets or granules or cut into individual plates or sheets from thicker blocks.

However, the hydrogel foams described above can additionally be modified to the effect that the surface of the foamed materials is postcrosslinked. This is a way of improving the gel stability of the articles formed from the foamed hydrogels. To perform surface postcrosslinking, the surface of the articles formed from the foamed hydrogels is treated with at least one crosslinking agent and the thus treated articles are heated to a temperature at which the crosslinkers will react with the hydrogels. Suitable crosslinkers are described above under (b). These compounds can likewise be used for postcrosslinking the surface of the hydrogel foams. Crosslinkers which are preferably used are the hereinabove mentioned glycidyl ethers and esters of acrylic acid and/or methacrylic acid with the reaction products of 1 mol of trimethylolpropane and from 6 to 15 mol of ethylene oxide.

The crosslinkers for the surface postcrosslinking are preferably applied to the foam surface in the form of an aqueous solution. The aqueous solution can include water-miscible organic solvents, for example alcohols such as methanol, ethanol and/or i-propanol or ketones such as acetone. The amount of crosslinker applied to the surface of the hydrogel foams is for example in the range from 0.1 to 5% by weight and preferably in the range from 1 to 2% by weight. The surface postcrosslinking of the hydrogel foams is effected by heating the hydrogel foams which have been treated with at least one crosslinker to a temperature which is for example in the range from 60 to 120° C. and preferably in the range from 70 to 100° C. After surface crosslinking, the water content of the foamed surface-postcrosslinked hydrogel can likewise be adjusted to values from 1 to 60% by weight.

The optionally surface-postcrosslinked hydrogel foams of the invention can be used for all the purposes for which for example the water-absorbing hydrogel foams which are known from EP-B-0 858 478 and which are based on acid group containing polymers such as crosslinked polyacrylates are used. The hydrogel foams of the invention are useful for example in hygiene articles to absorb body fluids, in dressing material to cover wounds, as a sealing material, as a packaging material, as a soil improver, as a soil substitute, to dewater sludges, to absorb aqueous acidic wastes, to thicken waterborne paints or coatings in the course of disposing of residual quantities thereof, to dewater water-containing oils or hydrocarbons or as a material for filters in ventilation systems.

Of particular importance is the use of the hydrogel foams of the invention in hygiene articles, such as baby diapers, sanitary napkins and incontinence articles, and in dressing material. In hygiene articles for example they perform more than one function, namely acquire, distribute and/or store body fluids. The surface of the hydrogel foams can optionally be modified by treatment with surfactants or polymers containing uncrosslinked vinylamine units. This provides an improvement in the acquisition of fluids.

Layers of the hydrogel foams according to the invention can be for example disposed in a thickness from 1 to 5 mm in one of the abovementioned hygiene articles as an absorbent core between a liquid-pervious topsheet and a liquid-impervious layer composed of a film of for example polyethylene or polypropylene. The liquid-pervious layer of the hygiene article is in use in direct contact with the skin of the user. This material is customarily composed of a nonwoven of natural fibers such as cellulose fibers or fluff. If desired, a tissue layer will be disposed above and/or below the absorbent core. Between the bottom layer of the hygiene article and the absorbent core, there may optionally be a storage layer composed of a conventional particulate anionic superabsorbent. When the foamed basic hydrogels are used as an absorbent core in diapers, the open-cell structure of the foamed basic hydrogel will ensure that the body fluid, which is normally applied in individual amounts all at once, is speedily removed. This gives the user a pleasant sense of the surface dryness of the diaper.

Methods of Determination

Density

Any suitable gravimetric method can be used for determining the density of the multicomponent foam system. What is determined is the mass of solid multicomponent foam system per unit volume of foam structure. A method for density determination of the multicomponent foam system is described in ASTM Method No. D 3574-86, Test A. This method was originally developed for the density determination of urethane foams, but can also be used for this purpose. By this method, the dry mass and volume of a preconditioned sample is determined at 22+/−2° C. Volume determination of larger sample dimensions are carried out under atmospheric pressure.

Free Swell Capacity (FSC)

This method is used to determine the free swellability of the multicomponent foam system in a teabag. To determine FSC, 0.2000±0.0050 g of dried foam is introduced into a teabag 60×85 mm in size, which is subsequently sealed shut. The teabag is placed in an excess of test solution (at least 0.83 l of sodium chloride solution/1 g of polymer powder) for 30 minutes. The teabag is subsequently allowed to drip for 10 minutes by being hung up by one corner. The amount of liquid is determined by weighing back the teabag.

The test solution used was 0.9% by weight NaCl solution.

Acquisition Time:

The multicomponent foam system is cut into layers 1.5 mm, 2 mm or 4 mm in thickness. A commercially available diaper is carefully cut open, the high loft used as acquisition medium removed and instead the multicomponent foam system 7×7 cm in size inserted. The diaper is resealed. The application of 0.9% sodium chloride solution is effected through a plastic plate having a ring in the middle (inner diameter of the ring 6.0 cm, height 4.0 cm). The plate is loaded with a weight so that the total load on the diaper is 13.6 g/cm$^2$. The plastic plate is placed on the diaper in such a way that the center of the diaper is also the center of the application ring. Three 10 ml lots of 0.9% NaCl solution are applied. The 0.9% NaCl solution is measured out in a graduated cylinder and applied to the diaper in a continuous stream through the ring in the plate. At the same time the time is taken for the solution to penetrate completely into the diaper. The time measured is noted as Acquisition Time 1. Thereafter, the diaper is loaded with a plate for 10 minutes, the load being maintained at 13.6 g/cm$^2$. Thereafter, the plate is removed, 10 g±0.5 g of Schleicher & Schuell S&S 2282, 10×10 cm filter paper are placed on the midpoint and loaded with a weight of 1200 g for 15 s. After this period, the weight is removed and the filter paper is weighed back. The weight difference is noted as Rewet 1. Thereafter, the plastic plate with application ring is again placed on the diaper and the second application of liquid takes place. The measured time is noted as Acquisition Time 2. The procedure is repeated as described. This gives Rewets 2 and 3 and also Acquisition Time 3.

Centrifuge Retention Capacity (CRC)

This method is used to determine the free swellability of the multicomponent foam system in a teabag. To determine CRC, 0.2000±0.0050 g of dried multicomponent foam is introduced into a teabag 60×85 mm in size, which is subsequently sealed shut. The teabag is placed in an excess of 0.9% by weight sodium chloride solution (at least 0.83 l of sodium chloride solution/l g of polymer powder) for 30 minutes. The teabag is then centrifuged at 250 G for 3 minutes. The amount of liquid is determined by weighing back the centrifuged teabag.

The test solution used was 0.9% by weight NaCl solution.

Free Swell Rate (FSR)

To determine the free swell rate, 0.50 g ($W_H$) of the multicomponent foam system is placed on the base of a plastic dish having a round bottom of about 6 cm. The plastic dish is about 2.5 cm deep and has a square opening of about 7.5 cm×7.5 cm. A funnel is then used to add 10 g ($W_U$) of a 0.9% NaCl solution into the center of the plastic dish. As soon as the liquid has contact with the multicomponent foam system, a watch is started and not stopped until the multicomponent foam system has completely taken up the entire liquid, ie until pooled liquid is absent. This time is noted as $t_A$. The free swell rate then computes from $$FSR=W_U/(W_H \times t_A).$$

Absorbency Against Pressure (AAP) (0.3 psi)

The measuring cell for determining AAP 0.3 psi is a Plexiglas cylinder 60 mm in internal diameter and 50 mm in height. Adhesively attached to its underside is a stainless steel sieve bottom having a mesh size of 36 μm. The measuring cell further includes a plastic plate 59 mm in diameter and a weight which can be placed into the measuring cell together with the plastic plate. The weight of the plastic plate and the weight together correspond to a weight loading of 0.3 psi. AAP 0.3 psi is determined by determining the weight of the empty Plexiglas cylinder and of the plastic plate and recording it as $W_0$. A piece of the multicomponent foam system 20 mm in diameter is then placed into the Plexiglas cylinder and weighed in. The plastic plate is then carefully placed in the Plexiglas cylinder and the entire unit is weighed and the weight is recorded as $W_a$. The weight is then placed on the plastic plate in the Plexiglas cylinder. A ceramic filter plate 120 mm in diameter and 0 in porosity is placed in the middle of a Petri dish 200 mm in diameter and 30 mm in height and sufficient 0.9% by weight sodium chloride solution is introduced for the surface of the liquid to be level without the surface of the filter plate being wetted. A round filter paper 90 mm in diameter and <20 μm in pore size (S&S 589 Schwarzband from Schleicher & Schüll) is subsequently placed on the ceramic plate. The Plexiglas cylinder containing the multicomponent foam system is then placed with the plastic plate and weight on top of the filter paper and left there for 60 minutes. At the end of this period, the complete unit is removed from the Petri dish and filter paper and subsequently the weight is removed from the Plexiglas cylinder. The Plexiglas cylinder containing swollen multicomponent foam system is weighed back together with the plastic plate and the weight is recorded as $W_b$.

Absorbency against pressure (AAP) is calculated by the following equation:

$$AAP\ 0.3\ psi\ [g/g]=[W_b-W_a]/[W_a-W_0]$$

K value

The K value was determined after H. Fikentscher, Cellulose-Chemie, Volume 13, 52-63 and 71-74 (1932) in 5% by weight aqueous solution at pH 7, 25° C. and a polymer concentration of 0.5% by weight.

Stiffness
Tensile strength
Toughness
Nominal strain at max load
Nominal strain at break were each determined in accordance with DIN/EN ISO 527-1, the sample specimen used satisfying the condition of DIN 53448/A, the clamped length was 30 mm and the test speed was 6 mm/min.

Unless suggested otherwise by the context, the percentages in the examples are by weight.

EXAMPLE 1

To 300 g of a 10% ultrafiltered aqueous solution of polyvinylamine having a K value of 90 were added 15 g of a 15% aqueous solution of a commercially available surfactant (addition product of 80 mol of ethylene oxide with 1 mol of a C16/C18 alcohol mixture) and 15 g of a 5% aqueous solution of ethylene glycol diglycidyl ether crosslinker. The crosslinkable mixture was foamed in the shearing zone of an Ultraturrax stirrer for 1 minute and then poured onto a Teflon support rimmed with aluminum. The mold containing the foamed crosslinkable mixture was stored at 70° C. in a drying cabinet overnight. During this time, the polyvinylamine became crosslinked and the foam completely dried. The hydrogel foam obtained was subsequently adjusted to a water content of 5%. It had the properties indicated in Table 1.

TABLE 1

| | |
|---|---|
| Absorbency Against Pressure (AAP) | 13.8 g/g |
| Free Swell Capacity (FSC) | 24.4 g/g |
| Centrifuge Retention Capacity (CRC) | 12.7 g/g |
| Free Swell Rate (FSR) | <0.05 g/g · sec. |

EXAMPLE 2

To 300 g of a 10% ultrafiltered aqueous solution of polyvinylamine having a K value of 90 were added 15 g of a 15% aqueous solution of a commercially available surfactant (addition product of 80 mol of ethylene oxide with 1 mol of a C16/C18 alcohol mixture) and 15 g of a 5% aqueous solution of ethylene glycol diglycidyl ether crosslinker. In addition, mixtures were prepared that included the amounts of pentane indicated in Table 2.

The crosslinkable mixtures were each foamed in the shearing zone of an Ultraturrax stirrer for 1 minute and then poured onto a Teflon support rimmed with aluminum. The foam layer in the mold was 6 mm deep. The mold containing the foamed crosslinkable mixture was stored at 70° C. in a drying cabinet overnight. During this time, the polyvinylamine became crosslinked and the foam completely dried. The hydrogel foam obtained in each case was subsequently adjusted to a water content of 5%. They had the properties indicated in Tables 2 and 3.

TABLE 2

| Wt % of pentane | Density g/cm³ | AAP @ 0.3 psi g/g | Teabag g/g | CRC g/g | FSR g/g/sec |
|---|---|---|---|---|---|
| 0% pentane | 0.34 | 13.8 | 24.4 | 12.7 | <0.05 |
| 2.5% pentane | 0.16 | 7.3 | 12.8 | 7.8 | 0.06 |
| 5% pentane | 0.18 | 7.8 | 44.8 | 14.9 | 0.3 |
| 10% pentane | 0.18 | 16.5 | 33.0 | 11.5 | 2.8 |

TABLE 3

|  | 0% Pentane | 10% Pentane |
|---|---|---|
| Properties at 5% water content | | |
| Stiffness kPa | 220 ± 28 | 420 ± 70 |
| Tensile strength kPa | 86 ± 2.7 | 130 ± 13 |
| Toughness J/m² | 3050 ± 350 | 4000 ± 780 |
| Nominal strain at max load % | 150 ± 7.5 | 140 ± 19 |
| Nominal strain at break % | 160 ± 7.8 | 145 ± 19 |
| Properties in swollen state | | |
| Stiffness kPa | 56 ± 9.1 | 140 ± 11 |
| Tensile strength kPa | 25 ± 1.5 | 25 ± 9.2 |
| Toughness J/m² | 353 ± 42 | 200 ± 69 |
| Nominal strain at max load % | 51 ± 5.4 | 14 ± 4 |
| Nominal strain at break % | 51 ± 5.6 | 14 ± 4 | dition product of 80 mol of ethylene oxide with 1 mol of a C16/C18 alcohol mixture) and 15 g of a 5% aqueous solution of ethylene glycol diglycidyl ether crosslinker. In addition, mixtures were prepared that included the amounts of cellulose fibers (Technocel fibers 1000, length of fibers 1000 µm) indicated in Table 4. The aqueous crosslinkable mixtures were each then homogenized at a stirrer speed of 200 rpm for 5 minutes and thereafter foamed at 750 rpm for 5 minutes by introducing nitrogen at a rate of 100 l/h.

The foamy mixtures thus prepared were then each poured onto a Teflon support rimmed with aluminum. The foam layer in the molds was 6 mm deep. The molds containing the foamed crosslinkable mixtures were stored at 70° C. in a drying cabinet overnight. During this time, the polyvinylamine became crosslinked and the foam completely dried. The fiber-containing hydrogel foam obtained was subsequently adjusted to a water content of 5%. They had the properties indicated in Tables 4 and 5.

TABLE 4

| Cellulose fibers [%] | Density g/cm³ | AAP@ 0.3 psi g/g | FSC [g/g] | CRC [g/g] | FSR g/g/cm³ |
|---|---|---|---|---|---|
| 0% | 0.34 | 13.8 | 24.4 | 12.7 | <0.05 |
| 25% | 0.35 | 10.7 | 23.6 | 5.6 | 4 |
| 50% | 0.41 | 10.6 | 23.8 | 4.5 | <0.05 |
| 100% | 0.42 | 10.6 | 21.1 | 3.6 | <0.06 |
| 200% | 0.43 | 4.4 | 8.2 | 2.8 | <0.06 |

TABLE 5

| | Cellulose fiber content of crosslinkable mixture | | | |
|---|---|---|---|---|
| | 0% | 25% | 50% | 200% |
| Properties of hydrogel foams at 5% water content | | | | |
| Stiffness kPa | 220 ± 28 | 1100 ± 180 | 1800 ± 270 | 6200 ± 500 |
| Tensile strength kPa | 86 ± 2.7 | 240 ± 15 | 330 ± 14 | 400 ± 110 |
| Toughness J/m² | 3050 ± 350 | 2100 ± 160 | 1600 ± 140 | 1100 ± 260 |
| Nominal strain at max load % | 150 ± 7.5 | 51.3 ± 1 | 27 ± 2.2 | 9 ± 1.6 |
| Nominal strain at break % | 160 ± 7.8 | 58.3 ± 0.89 | 32 ± 2.7 | 20 ± 5.1 |
| Properties of hydrogel foams in swollen state | | | | |
| Stiffness kPa | 56 ± 9.1 | 140 ± 16 | 310 ± 22 | 850 ± 94 |
| Tensile strength kPa | 25 ± 1.5 | 34.5 ± 0.22 | 50 ± 2.5 | 82 ± 8.6 |
| Toughness J/m² | 353 ± 42 | 221 ± 11 | 180 ± 19 | 180 ± 24 |
| Nominal strain at max load % | 51 ± 5.4 | 34.9 ± 1.1 | 18.7 ± 0.87 | 11.8 ± 0.83 |
| Nominal strain at break % | 51 ± 5.6 | 36 ± 1.4 | 20 ± 1.5 | 20 ± 3 |

EXAMPLE 3

To 300 g of a 10% ultrafiltered aqueous solution of polyvinylamine having a K value of 90 were added 15 g of a 15% aqueous solution of a commercially available surfactant (ad-

EXAMPLE 4

To 300 g of a 10% ultrafiltered aqueous solution of polyvinylamine having a K value of 90 were added 15 g of a 15% aqueous solution of a commercially available surfactant (addition product of 80 mol of ethylene oxide with 1 mol of a C16/C18 alcohol mixture) and 15 g of a 5% aqueous solution of ethylene glycol diglycidyl ether crosslinker. The constituents of the mixture were each stirred, initially at 200 rpm for 5 minutes and then at 750 rpm again for 5 minutes, while a 100 l/h nitrogen stream was passed through, to form a crosslinkable foam.

The foam thus prepared was then poured onto a Teflon support rimmed with aluminum. The foam layer in the molds was 6 mm deep. The mold containing the foamed crosslinkable mixture was stored at 70° C. in a drying cabinet overnight. During this time, the polyvinylamine became crosslinked and the foam completely dried. Samples of the foam thus prepared were adjusted to a water content of 5%. Thereafter, each of the acids indicated in Table 6 were sprayed onto the foam samples, so that the foam surface had a pH in the acidic range. Thereafter, the flexibility of the foams was evaluated. The results are indicated in Table 6.

TABLE 6

| Foam treated with | Degree of neutralization [%] | pH | FSC [g/g] | CRC [g/g] | Flexibility at 20% RH |
|---|---|---|---|---|---|
| — | 0 | 10.0 | 25 | 13 | Flexible |
| HCl | 75 | 4.3 | 48 | 27 | Rigid |
| Methanesulfonic acid | 75 | 3.6 | 32 | 17 | Flexible |
| Lactic acid | 75 | 5.6 | 31 | 13 | Flexible |
| Citric acid | 75 | 3.3 | 3 | 1 | Rigid |
| Hydroxysuccinic acid | 75 | 3.2 | 4 | 2 | Rigid |
| Sulfamic acid | 75 | 4.4 | 7 | 4 | Rigid |
| Ascorbic acid | 75 | 4.2 | 4 | 3 | Rigid |
| Glycolic acid | 75 | 4.8 | 13 | 10 | Partly flexible |
| Cyanoacetic acid | 75 | 5.3 | 28 | 14 | Partly flexible |

Preparation of an Acidic Particulate Water-Absorbing Polymer (SAP 1)

270 g of acrylic acid were weighed into a glass beaker. 1.155 g of methylenebisacrylamide (MBA) crosslinker were then added and the monomers were stirred until completely dissolved. 810 g of distilled water were weighed into a separate vessel and added to the monomer mixture. The solution was stirred to complete the mixture. The aqueous solution was then kept in a refrigerator for about one hour to cool down.

Distilled water was used to prepare a 10% sodium persulfate solution and it was added to a cooled polymerization vessel. 0.157 g of 2-hydroxy-2-methyl-1-phenylpropan-1-one (Darocur 1173, Ciba, photoinitiator) and 2.736 g of the 10% sodium persulfate solution were added as an initiator system. A final mixing step gave a homogeneous system which was left alone until it had attained a temperature of 10° C., at which point the polymerization reaction was carried out in the course of 12 minutes by irradiating with 20 mWcm$^{-2}$ UV energy. This gave a gellike polymer which was comminuted and completely dried at 125° C. The dried polymer obtained was ground and sieved to collect the fraction having an average particle size of 150 μm-450 μm.

EXAMPLE 5

To 300 g of a 10% ultrafiltered aqueous solution of polyvinylamine having a K value of 90 were added 15 g of a 15% aqueous solution of a commercially available surfactant (addition product of 80 mol of ethylene oxide with 1 mol of a C16/C18 alcohol mixture) and 15 g of a 5% aqueous solution of ethylene glycol diglycidyl ether crosslinker. The crosslinkable mixture was foamed in the shearing zone of an Ultraturrax stirrer for 1 minute. Further crosslinkable mixtures were prepared from the abovementioned components and the amounts of pentane indicated in Table 7 and foamed by shearing with an Ultraturrax instrument for 1 minute.

45 g of SAP 1 (particle size 150-450 μm) were then added and the mixture was homogenized by further shearing for about 1 minute. The foam mixtures thus prepared were then each poured onto a Teflon support rimmed with aluminum. The foam layer in the molds as 6 mm deep. The molds containing the foamed crosslinkable mixtures were stored at 70° C. in a drying cabinet overnight. During this period, the polyvinylamine became crosslinked and the foam completely dried. The hydrogel foams obtained in each case were subsequently adjusted to a water content of 5%. They had the properties indicated in Table 7.

TABLE 7

| Pentane content of aq. mix | Foam density g/cm$^3$ | FSC g/g 30 min | CRC g/g 30 min | FSC g/g 4 h | CRC g/g 4 h | AAP g/g 0.3 psi | FSR g/g/sec |
|---|---|---|---|---|---|---|---|
| 0% | 0.66 | 10.4 | 6.5 | 23.5 | 18.9 | 7.2 | >0.06 |
| 10% | 0.20 | 49.3 | 20.7 | 57.4 | 25.1 | 30.4 | 0.95 |
| 15% | 0.21 | 49.2 | 19.1 | 56.4 | 23.9 | 30.5 | 0.74 |
| 20% | 0.19 | 50.1 | 19.2 | 56.3 | 24.7 | 27.7 | 0.66 |

The test results show that the multicomponent foam system gave the best performance when prepared from a starting mixture having a blowing agent content of 10% pentane, based on the total amount of the aqueous starting solution.

EXAMPLE 6

To 300 g of a 10% ultrafiltered aqueous solution of polyvinylamine having a K value of 90 were added 15 g of a 15% aqueous solution of a commercially available surfactant (addition product of 80 mol of ethylene oxide with 1 mol of a C16/C18 alcohol mixture) and 15 g of a 5% aqueous solution of ethylene glycol diglycidyl ether crosslinker and 3 g of pentane. The crosslinkable mixture was foamed in the shearing zone of an Ultraturrax stirrer for 1 minute. The samples of the crosslinkable aqueous mixture were then each admixed with 45 g of SAP 1 having a particle size distribution indicated in each case in Table 8. The mixture was then stirred for 1 minute. A homogeneous mixture was obtained.

The crosslinkable foam mixtures thus prepared were then each poured onto a Teflon support rimmed with aluminum. The foam layer in the molds was 36 mm deep. The molds containing the foamed crosslinkable mixtures were stored at 70° C. in a drying cabinet overnight. During this period, the polyvinylamine became crosslinked and the foam completely dried. The hydrogel foams obtained in each case were subsequently adjusted to a water content of 5%. They had the properties indicated in Table 7.

TABLE 8

| SAP 1 particle size | Foam density g/cm$^3$ | FSC g/g 30 min | CRC g/g 30 min | FSC g/g 4 h | CRC g/g 4 h | AAP g/g 0.3 psi | FSR g/g/sec |
|---|---|---|---|---|---|---|---|
| 150-850 μm | 0.2 | 32.1 | 15.1 | 49.7 | 24.2 | 9.3 | 0.1 |
| 150-450 μm | 0.2 | 53.4 | 23.1 | 64.0 | 27.8 | 9.5 | 0.65 |

In general, the particle size section from 150 to 450 μm possesses a distinctly superior absorption profile, due perhaps partly to better integration of small particles within the foam system and partly to reduced impairment of fluid transportation within the channel system by large swelling SAP 1 particles.

EXAMPLE 7

To 300 g of a 10% ultrafiltered aqueous solution of polyvinylamine (PVAm) having a K value of 90 were added 15 g of a 15% aqueous solution of a commercially available surfactant (addition product of 80 mol of ethylene oxide with 1 mol of a C16/C18 alcohol mixture) and 15 g of a 5% aqueous solution of ethylene glycol diglycidyl ether crosslinker and 3 g of pentane. The crosslinkable mixture was foamed in the shearing zone of an Ultraturrax stirrer for 1 minute. Samples of the crosslinkable aqueous mixture were then admixed with SAP 1 having an average particle size distribution of 150-450 μm in the polyvinylamine:SAP 1 weight ratios indicated in each case in Table 9. The mixtures were then each stirred for 1 minute. Homogeneous mixtures were obtained.

The crosslinkable foam mixtures thus prepared were then each poured onto a Teflon support rimmed with aluminum. The foam layer in the molds was 6 mm deep. The molds containing the foamed crosslinkable mixtures were stored at 70° C. in a drying cabinet overnight. During this period, the polyvinylamine became crosslinked and the foam completely dried. The hydrogel foams obtained in each case were subsequently adjusted to a water content of 5%. They had the properties indicated in Table 9.

TABLE 3

| Sample | Foam density g/cm³ | FSC g/g 30 min | CRC g/g 30 min | FSC g/g 4 h | CRC g/g 4 h | AAP g/g 0.3 psi | FSR g/g/sec |
|---|---|---|---|---|---|---|---|
| 30 PVAm: 70 SAP 1 | 0.20 | 41.7 | 13.5 | 58.6 | 19.9 | 26.3 | 0.12 |
| 40 PVAm: 60 SAP 1 | 0.20 | 49.3 | 20.7 | 57.4 | 25.1 | 30.4 | 0.95 |
| 50 PVAm: 50 SAP 1 | 0.12 | 37.1 | 12.0 | 52.0 | 19.8 | 29.4 | 0.11 |
| 60 PVAm: 40 SAP 1 | 0.12 | 37.5 | 11.9 | 47.3 | 18.0 | 24.8 | 0.29 |

The best performance of the foams prepared was obtained in the case of a combination of the multicomponent system in a PVAm:SAP 1 ratio of 40:60.

EXAMPLE 8

To 300 g of a 10% ultrafiltered aqueous solution of polyvinylamine (PVAm) having a K value of 90 were added 15 g of a 15% aqueous solution of a commercially available surfactant (addition product of 80 mol of ethylene oxide with 1 mol of a C16/C18 alcohol mixture) and 15 g of a 5% aqueous solution of ethylene glycol diglycidyl ether crosslinker and 3 g of pentane. The crosslinkable mixture was foamed in the shearing zone of an Ultraturrax stirrer for 1 minute. The crosslinkable aqueous mixture was then admixed with 45 g of SAP 1 having an average particle size distribution of 150-450 μm and the mixture was then homogenized by treatment with an Ultraturrax for 1 minute in each case.

Two further crosslinkable foam mixtures of the abovementioned composition were prepared and they were then each poured onto a Teflon support rimmed with aluminum. The foam layer in the molds was 6 mm deep. The molds containing the foamed crosslinkable mixtures were stored overnight in a drying cabinet at the temperatures indicated in Table 10. During this period, the polyvinylamine became crosslinked and the foam completely dried. The hydrogel foams obtained in each case were subsequently adjusted to a water content of 5%. They had the properties indicated in Table 10.

TABLE 10

| Temperature | Foam density g/cm³ | FSC g/g 30 min | CRC g/g 30 min | FSC g/g 4 h | CRC g/g 4 h | AAP g/g 0.3 psi | FSR g/g/sec |
|---|---|---|---|---|---|---|---|
| 60° C. | 0.21 | 47.1 | 21.4 | 50.2 | 29.5 | 28.9 | 0.70 |
| 70° C. | 0.21 | 46.0 | 16.7 | 53.6 | 21.0 | 26.5 | 0.43 |
| 90° C. | 0.21 | 41.7 | 15.2 | 52.0 | 19.6 | 25.0 | 0.32 |

Crosslinking and drying temperatures influence the performance to different degrees. Whereas the absorption performance in the teabag test is highest after 30 minutes at 60° C., earlier saturation in the 4 hour value is achieved compared with higher temperatures. However, retention values and incipient swelling rate are optimal at this temperature.

EXAMPLE 9

To 300 g of a 10% ultrafiltered aqueous solution of polyvinylamine (PVAm) having a K value of 90 were added 15 g of a 15% aqueous solution of a commercially available surfactant (addition product of 80 mol of ethylene oxide with 1 mol of a C16/C18 alcohol mixture) and 15 g of a 5% aqueous solution of ethylene glycol diglycidyl ether crosslinker and 3 g of pentane. The crosslinkable mixture was foamed in the shearing zone of an Ultraturrax stirrer for 1 minute. The crosslinkable aqueous mixture was then admixed with 45 g of SAP 1 having an average particle size distribution of 150-450 Mm and the mixture was then homogenized by treatment with an Ultraturrax for 1 minute in each case.

Further crosslinkable foam mixtures of the abovementioned composition were prepared and they were then each poured onto a Teflon support rimmed with aluminum. The foam layer in the molds was 6 mm deep. The molds containing the foamed crosslinkable mixtures were stored overnight in a drying cabinet at the temperatures indicated in Tables 11 to 13. During this period, the polyvinylamine became crosslinked and the foam completely dried. Thereafter, the foams were stored for 1 hour at the temperatures indicated in Tables 11 to 13 in order to cure the interfacial areas between the basic polymer and the acidic polymer. The hydrogel foams obtained in each case were subsequently adjusted to a water content of 5%. They had the properties indicated in Tables 11 to 13.

TABLE 11

Drying overnight at 60° C., followed by 1 hour drying at various temperatures

| Drying temperature 1 h | Foam density g/cm³ | FSC g/g 30 min | CRC g/g 30 min | FSC g/g 4 h | CRC g/g 4 h | AAP g/g 0.3 psi | FSR g/g/sec |
|---|---|---|---|---|---|---|---|
| 0° C. | 0.21 | 47.1 | 21.4 | 50.2 | 29.5 | 28.9 | 0.70 |
| 100° C. | 0.21 | 46.4 | 19.2 | 46.6 | 25.7 | 27.2 | 0.50 |

TABLE 11-continued

Drying overnight at 60° C., followed by 1 hour drying at various temperatures

| Drying temperature 1 h | Foam density g/cm³ | FSC g/g 30 min | CRC g/g 30 min | FSC g/g 4 h | CRC g/g 4 h | AAP g/g 0.3 psi | FSR g/g/sec |
|---|---|---|---|---|---|---|---|
| 125° C. | 0.21 | 37.1 | 16.2 | 42.3 | 23.9 | 26.5 | 0.25 |
| 140° C. | 0.21 | 27.3 | 13.2 | 35.9 | 19.5 | 27.4 | 0.10 |

TABLE 12

Drying overnight at 70° C., followed by 1 hour drying at various temperatures

| Drying temperature 1 h | Foam density g/cm³ | FSC g/g 30 min | CRC g/g 30 min | FSC g/g 4 h | CRC g/g 4 h | AAP g/g 0.3 psi | FSR g/g/sec |
|---|---|---|---|---|---|---|---|
| 0° C. | 0.21 | 46.0 | 16.7 | 53.6 | 21.0 | 26.5 | 0.43 |
| 100° C. | 0.21 | 43.2 | 16.6 | 53.2 | 21.5 | 25.4 | 0.46 |
| 125° C. | 0.21 | 39.4 | 14.6 | 49.7 | 19.6 | 26.2 | 0.26 |
| 140° C. | 0.21 | 31.5 | 12.6 | 40.1 | 16.4 | 23.7 | 0.08 |

TABLE 13

Drying overnight at 90° C., followed by 1 hour drying at various temperatures

| Drying temperature 1 h | Foam density g/cm³ | FSC g/g 30 min | CRC g/g 30 min | FSC g/g 4 h | CRC g/g 4 h | AAP g/g 0.3 psi | FSR g/g/sec |
|---|---|---|---|---|---|---|---|
| 0° C. | 0.21 | 41.7 | 15.2 | 52.0 | 19.6 | 25.0 | 0.32 |
| 100° C. | 0.21 | 40.1 | 14.8 | 50.8 | 19.4 | 24.2 | 0.24 |
| 125° C. | 0.21 | 35.9 | 15.1 | 46.5 | 19.3 | 22.6 | 0.14 |
| 140° C. | 0.21 | 30.1 | 12.5 | 40.9 | 15.8 | 18.7 | 0.09 |

EXAMPLE 10

To 300 g of a 10% ultrafiltered aqueous solution of polyvinylamine having a K value of 90 were added 15 g of 5% aqueous solution of a commercially available surfactant (sodium C14-C17 sec-alkylsulfonate, Hostapur® SAS93, from Clariant), 15 g of a 5% aqueous solution of ethylene glycol diglycidyl ether crosslinker and 3 g of pentane. Mixtures containing the amounts of surfactant which are reported in Table 14 were prepared in addition.

The crosslinkable mixture was foamed in the shearing zone of an Ultraturrax stirrer for 1 minute and then poured onto a Teflon support rimmed with aluminum. The mold containing the foamed crosslinkable mixture was stored in a drying cabinet at 70° C. overnight. During this period, the polyvinylamine became crosslinked and the foam completely dried. The hydrogel foam obtained was subsequently adjusted to a water content of 5%. The foams had the properties reported in Table 14. The foam produced according to Example 2 was stiff, whereas the foams obtained according to Examples 10-1 to 10-3 were very soft.

TABLE 14

| Example | % surfactant | Density g/cm³ | AAP @ 0.3 psi g/g | FSC (30 min) g/g | CRC g/g | FSR g/g/sec |
|---|---|---|---|---|---|---|
| 10 | 7.5 | 0.19 | 5.2 | 29.9 | 10.8 | 2.88 |
| 10 - 1 | 2.5 | 0.12 | 9 | 35.1 | 11.5 | 7.55 |
| 10 - 2 | 5 | 0.13 | 8.4 | 32.7 | 11.2 | 6.64 |
| 10 - 3 | 10 | 0.13 | 9.3 | 30.1 | 11.3 | 3.29 |

EXAMPLE 11

To 300 g of a 10% ultrafiltered aqueous solution of polyvinylamine having a K value of 90 were added 7.5 g of a 30% aqueous solution of commercially available surfactant (alkali metal salt of monosulfates of addition products of ethylene oxide and propylene oxide with a fatty alcohol, Disponil® FES993 IS ex Cognis), 15 g of a 5% aqueous solution of ethylene glycol diglycidyl ether crosslinker and 3 g of pentane. Mixtures containing the amounts of surfactant which are reported in Table 15 were prepared in addition.

The crosslinkable mixture was foamed in the shearing zone of an Ultraturrax stirrer for 1 minute and then poured onto a Teflon support rimmed with aluminum. The mold containing the foamed crosslinkable mixture was stored in a drying cabinet at 70° C. overnight. During this period, the polyvinylamine became crosslinked and the foam completely dried. The hydrogel foam obtained was subsequently adjusted to a water content of 5%. A foam produced according to Example 2 was stiff, whereas the foams produced as per Examples 11-1 to 11-3 felt very soft. Further properties of the foams are reported in Table 15.

TABLE 15

| Example | % surfactant | Density g/cm³ | AAP @ 0.3 psi g/g | FSC (30 min) g/g | CRC g/g | FSR g/g/sec |
|---|---|---|---|---|---|---|
| 11 - 1 | 2.5 | 0.105 | 6.7 | 41.5 | 12.4 | 2.4 |
| 11 - 2 | 5 | 0.106 | 8.1 | 40.5 | 11.7 | 3.5 |
| 11 - 3 | 10 | 0.096 | 7 | 38.1 | 11.7 | 3.9 |

EXAMPLE 12

To 300 g of a 10% ultrafiltered aqueous solution of polyvinylamine having a K value of 90 were added 7.5 g of a 30% aqueous solution of commercially available surfactant (alkali metal salt of monosulfates of addition products of ethylene oxide and propylene oxide with a fatty alcohol, Disponil® FES 32 IS ex 40 Cognis), 15 g of a 5% aqueous solution of ethylene glycol diglycidyl ether crosslinker and 3 g of pentane. Mixtures containing the amounts of surfactant which are reported in Table 16 were prepared in addition.

The crosslinkable mixture was foamed in the shearing zone of an Ultraturrax stirrer for 1 minute and then poured onto a Teflon support rimmed with aluminum. The mold containing the foamed crosslinkable mixture was stored in a drying cabinet at 70° C. overnight. During this period, the polyvinylamine became crosslinked and the foam completely dried. The hydrogel foam obtained was subsequently adjusted to a water content of 5%. A foam produced according to Example 2 was stiff, whereas the foams produced as per Examples 12-1 to 12-3 felt very soft. The foams had the properties reported in Table 16.

TABLE 16

| Example | % surfactant | Density g/cm$^3$ | AAP @ 0.3 psi g/g | FSC (30 min) g/g | CRC g/g | FSR g/g/sec |
|---|---|---|---|---|---|---|
| 12 - 1 | 2.5 | 0.094 | 9.1 | 42 | 11.8 | 3.11 |
| 12 - 2 | 5 | 0.083 | 10.4 | 34.9 | 11.5 | 3.11 |
| 12 - 3 | 10 | 0.084 | 10.1 | 36.5 | 11.3 | 2.84 |

EXAMPLE 13

To 300 g of a 10% ultrafiltered aqueous solution of polyvinylamine having a K value of 90 were added 15 g of a 5% aqueous solution of a commercially available surfactant (sodium C14-C17 sec-alkylsulfonate, Hostapur® SAS93, from Clariant) in the amounts reported in Table 17, 15 g of a 5% aqueous solution of ethylene glycol diglycidyl ether crosslinker and 3 g of pentane. Mixtures containing the amounts of surfactant which are reported in Table 17 were prepared in addition.

The crosslinkable mixture were then each foamed for 1 minute in the shearing zone of an Ultraturrax stirrer. Samples of the crosslinkable aqueous mixture were then admixed with 45 g of SAP 1. The mixture was then stirred for 1 minute. A homogeneous mixture was obtained. The thus produced crosslinkable mixtures in foam form were then each poured onto a Teflon support rimmed with aluminum. The mold containing the foamed crosslinkable mixture was stored in a drying cabinet at 70° C. overnight. During this period, the hydrogel foam obtained was completely dried and subsequently moistened with water to adjust it to a water content of 5%. The foams had the properties reported in Table 17. A foam produced according to Example 6 was stiff, whereas the foams produced according to Examples 13-1 and 13-2 felt very soft.

TABLE 17

| Example | % surfactant | Density g/cm$^3$ | AAP @ 0.3 psi g/g | FSC (30 min) g/g | CRC g/g | FSR g/g/sec |
|---|---|---|---|---|---|---|
| 13 - 1 | 2.5 | 0.22 | 8.4 | 43.6 | 18.1 | 1.4 |
| 13 - 2 | 5 | 0.26 | 12.4 | 43.2 | 17.2 | 0.79 |

EXAMPLE 14

To 300 g of a 10% ultrafiltered aqueous solution of polyvinylamine having a K value of 90 were added 7.5 g of a 30% aqueous solution of commercially available surfactant (alkali metal salt of monosulfates of addition products of ethylene oxide and propylene oxide with a fatty alcohol, Disponil® FES993 IS ex Cognis), 15 g of a 5% aqueous solution of ethylene glycol diglycidyl ether crosslinker and 3 g of pentane.

The crosslinkable mixture were then each foamed for 1 minute in the shearing zone of an Ultraturrax stirrer. The foamed sample was then admixed with 45 g of SAP 1, stirred for 1 minute and then poured onto a Teflon support rimmed with aluminum. The mold containing the foamed crosslinkable mixture was stored in a drying cabinet at 70° C. overnight. During this period, the hydrogel foam obtained was completely dried and subsequently moistened with water to adjust it to a water content of 5%. A foam produced according to Example 6 was stiff, whereas the foams produced as per Example 14-1 felt very soft. The foam had the properties reported in Table 18.

TABLE 18

| Example | % surfactant | Density g/cm$^3$ | AAP @ 0.3 psi g/g | FSC (30 min) g/g | CRC g/g | FSR g/g/sec |
|---|---|---|---|---|---|---|
| 14 - 1 | 2.5 | 0.16 | 9.6 | 44.1 | 19.5 | 1.3 |

EXAMPLE 15

To 300 g of a 10% ultrafiltered aqueous solution of polyvinylamine having a K value of 90 were added 7.5 g of a 30% aqueous solution of commercially available surfactant (alkali metal salt of monosulfates of addition products of ethylene oxide and propylene oxide with a fatty alcohol, Disponil® FES 32 IS ex Cognis), 15 g of a 5% aqueous solution of ethylene glycol diglycidyl ether crosslinker and 3 g of pentane. A mixture containing the amounts of surfactant which are reported in Table 19 was prepared in addition.

The crosslinkable mixtures were then each foamed for 1 minute in the shearing zone of an Ultraturrax stirrer. The foamed sample was then admixed with 45 g of SAP 1, stirred for 1 minute and then poured onto a Teflon support rimmed with aluminum. The mold containing the foamed crosslinkable mixture was stored in a drying cabinet at 70° C. overnight. During this period, the hydrogel foam obtained was completely dried. The water content of the hydrogel was thereafter adjusted to 5%. The foam was very soft and had the properties reported in Table 19.

TABLE 19

| Example | % surfactant | Density g/cm$^3$ | AAP @ 0.3 psi g/g | FSC (30 min) g/g | CRC g/g | FSR g/g/sec |
|---|---|---|---|---|---|---|
| 15 - 1 | 2.5 | 0.19 | 7.7 | 42.8 | 19.6 | 0.67 |

We claim:

1. A water-absorbing basic polymer foam prepared by
    (I) foaming a crosslinkable aqueous mixture including
        (a) at least one basic polymer whose basic groups have optionally been neutralized, said basic polymer free of acid monomers,
        (b) at least one crosslinker,
        (c) at least one surfactant,
        (d) optionally at least one solubilizer,
        (e) optionally thickeners, foam stabilizers, fillers, fibers, cell nucleators, and mixtures thereof and
        (f) optionally particulate water-absorbing acidic polymers,
    by dissolving a gas which is inert toward free radicals in the crosslinkable aqueous mixture under a pressure from 2 to 400 bar and subsequently decompressing the crosslinkable aqueous mixture to atmospheric or by dispersing fine bubbles of a gas which is inert toward free radicals, and
    (II) crosslinking the foamed mixture to form a hydrogel foam and optionally adjusting a water content of the polymer foam to 1-60% by weight.

2. The foam of claim 1 wherein the basic polymer comprises polymers containing vinylamine units, polymers containing vinylguanidine units, polymers containing dialkylaminoalkyl(meth)acrylamide units, polyethyleneimines, ethylenimine-grafted polyamidoamines, polydiallyldimethylammonium chlorides, or a mixture thereof.

3. The foam of claim 1 wherein the basic polymer comprises polymers containing vinylamine units, polyvinylguanidines, polyethyleneimines, or a mixture thereof.

4. The foam of claim 1 wherein the basic polymer comprises polyvinylamines and/or 10-100% hydrolyzed poly-N-vinylformamides.

5. The foam of claim 1 whose surface has been post-crosslinked.

6. The foam of claim 1 wherein the crosslinkable aqueous mixture includes particulate water-absorbing acidic polymers, the aqueous mixture including from 10 to 90% by weight of water-absorbing acidic polymers.

7. The foam of claim 1 wherein the water-absorbing acidic polymers are crosslinked acrylic acids having a particle diameter from 10 to 2000 μm.

8. A process for producing foams comprising a water-absorbing basic polymer, which comprises
   (I) foaming a crosslinkable aqueous mixture including
      (a) at least one basic polymer whose basic groups have optionally been neutralized, said basic polymer free of acid monomers,
      (b) at least one crosslinker,
      (c) at least one surfactant,
      (d) optionally at least one solubilizer,
      (e) optionally thickeners, foam stabilizers, fillers, fibers, cell nucleators, and mixtures thereof, and
      (f) optionally particulate water-absorbing acidic polymers.
   by dissolving a gas which is inert toward free radicals in the crosslinkable aqueous mixture under a pressure from 2 to 400 bar and subsequently decompressing the crosslinkable aqueous mixture to atmospheric or by dispersing fine bubbles of a gas which is inert toward free radicals, and
   (II) crosslinking the foamed mixture to form a hydrogel foam and optionally adjusting a water content of the polymer foam to 1-60% by weight.

9. The process of claim 8 wherein from 0.05 to 20 parts by weight of an acidic water-absorbing polymer having a degree of neutralization from 0 to 75 mol % are used per part by weight of a basic polymer.

10. The process of claim 8 wherein the crosslinkable aqueous mixture includes from 0.1 to 30% by weight of a hydrocarbon.

11. A hygiene article for absorbing body fluids comprising a foam of claim 1.

12. A dressing material for covering wounds comprising a foam of claim 1.

13. A sealing material comprising a foam of claim 1.

14. A packaging material comprising a foam of claim 1.

15. A soil improver comprising a foam of claim 1.

16. A soil substitute comprising a foam of claim 1.

* * * * *